United States Patent [19]
Peacock

[11] Patent Number: 4,967,157
[45] Date of Patent: Oct. 30, 1990

[54] METHOD AND CIRCUIT FOR EXTENDING THE RANGE OF A COLD CATHODE DISCHARGE VACUUM GAUGE

[75] Inventor: Roy N. Peacock, Lafayette, Colo.

[73] Assignee: MKS Instruments, Inc., Andover, Mass.

[21] Appl. No.: 237,704

[22] Filed: Aug. 29, 1988

[51] Int. Cl.$^5$ .................. G01L 21/34; G01L 21/30
[52] U.S. Cl. .................. 324/460; 324/464; 324/459
[58] Field of Search .................. 324/459–464, 324/62, 142, 713; 364/558, 482, 483, 761; 73/753; 315/111.91

[56] References Cited

U.S. PATENT DOCUMENTS

| | | | |
|---|---|---|---|
| Re. 25,369 | 4/1963 | Redhead | 324/463 |
| 3,172,009 | 3/1965 | Asamaki | 315/273 |
| 3,277,295 | 10/1966 | Briggs | 250/299 |
| 3,379,967 | 4/1968 | Herrwerth et al. | 324/463 |
| 3,383,149 | 5/1968 | Bryant et al. | 445/9 |
| 3,447,072 | 5/1969 | Sheldon | 324/463 |
| 3,622,870 | 11/1971 | Hamilton et al. | 324/463 |
| 3,872,377 | 3/1975 | Kageyama et al. | 324/463 |
| 3,984,768 | 10/1976 | Staples | 324/62 |
| 4,000,457 | 12/1976 | O'Neal, III | 324/463 |
| 4,264,860 | 4/1981 | Thebault | 324/62 |
| 4,314,205 | 2/1982 | Paitich et al. | 324/460 |
| 4,596,148 | 6/1986 | Lässer et al. | 324/461 X |
| 4,651,086 | 3/1987 | Domenichini et al. | 324/64 |
| 4,747,311 | 5/1988 | Hojoh | 324/460 X |
| 4,783,748 | 11/1988 | Swarztrauber | 324/142 X |

FOREIGN PATENT DOCUMENTS 555134  8/1943  United Kingdom ............. 324/460

Primary Examiner—Reinhard J. Eisenzopf
Assistant Examiner—Jack B. Harvey
Attorney, Agent, or Firm—Sixbey, Friedman, Leedom & Ferguson

[57] ABSTRACT

A method and circuit for measuring the pressure of a gas with a cold cathode ionization gauge by measuring the electrical resistance or conductance of the gauge to thus extend the measurement range of the gauge. Current into the gauge may be limited to a substantially constant value at pressures greater than about $10^{-6}$ Torr, for example, so that the gauge voltage varies monotonically with respect to pressure at pressures greater than $10^{-6}$ Torr.

39 Claims, 6 Drawing Sheets

4,967,157

METHOD AND CIRCUIT FOR EXTENDING THE RANGE OF A COLD CATHODE DISCHARGE VACUUM GAUGE

BACKGROUND OF THE INVENTION

This invention relates to an improved method and circuit for controlling a cold cathode discharge vacuum gauge and, in particular, for extending the range thereof.

The description of the cold cathode discharge vacuum gauge was published by Penning in 1937. Such gauges consist of an anode and cathode within a vacuum enclosure having a tubulation to connect to the system whose pressure is to be measured. A potential of several thousand volts is applied between the electrodes, and a magnetic field is provided such that the magnetic field is perpendicular to the electric field of the electrodes. Electrons are trapped in the crossed electric and magnetic fields. Collisions of the electrons with residual gas molecules produce ions, which are collected by the cathode. With this arrangement, a pressure dependent current is found in the anode—cathode circuit which obeys the relationship $$I_{gauge} = K\, p^n$$

over a pressure range of approximately $10^{-8}$ to $10^{-4}$ Torr.

In this equation, $I_{gauge}$ is the observed gauge current, K is a constant, P is the pressure, and n is a constant whose usual value is between 1.00 and 1.15 depending upon the specific gauge. FIG. 1 shows a typical current versus pressure characteristic for a gauge of the inverted magnetron type operated with an anode voltage of 4.00 kV, and with a one megohm in series with the high voltage power supply to anode lead. The current departs from the power law for pressure below $10^{-8}$ Torr, but obeys it accurately at higher pressures. Historically, most cold cathode ionization gauges simply use this current—pressure relationship to determine the pressure.

As may be seen from the curve of FIG. 1, the tube input current and thus the power become appreciable at pressures greater than $10^{-4}$ Torr. At $10^{-4}$ Torr the current is $4 \times 10^{-4}$ A, and the power 1.6 W. The effect of operation at high currents is to accelerate damage to the tube. Ion sputtering leads to the formation of conducting films on the high voltage feedthrough insulators and the support insulators for the electrodes. Leakage currents in these films mask the small ion currents at low pressures. Allowing the current to increase to larger values also means that heavier and more expensive high voltage supplies are required.

It is desirable, however, to be able to operate a gauge over the widest possible range. Otto Klemperer in British Patent No. 555,134 noted that at high pressures it was possible to operate a cold cathode gauge in another manner. He stated that the anode voltage needed to maintain a fixed small current was a measure of pressure. In this mode of operation the power input presents problems. The power supply must function at constant voltage at low pressures, and constant current at high pressures. The measured signal is current in one case and voltage in the other. The changeover in operation would almost inevitably produce a discontinuity and therefore an inaccuracy, in the pressure displayed.

SUMMARY OF THE INVENTION

In accordance with the present invention, a single pressure dependent parameter is used over the full range of the cold cathode gauge. Both current and voltage are measured simultaneously and then tube resistance (or equally the conductance) is formed as the ratio of voltage and current. Since the resistance varies monotonically over the full pressure range, a single pressure related parameter is formed. Moreover, a large series resistor may be used in series with the high voltage supply such that the current tends toward a constant, predetermined, value at high pressures. Using such a resistor, the anode to cathode voltage is pressure dependent at pressures above $10^{-6}$ Torr. At lower pressures the effect of the large resistor is negligible, and the current varies according to the power law given above.

Other objects of the invention will become apparent from a reading of the following specification and claims.

BRIEF DESCRIPTION OF THE DRAWINGS

FIG. 4 is a plot of sensor or gauge resistance plotted versus pressure for the same calibration run for which FIG. 2 shows the current and FIG. 3 the voltage where each point was obtained by dividing the voltage by the current. Note that the resistance makes a smoothly varying function over the entire range from $10^{-10}$ to $10^{-2}$ Torr.

DETAILED DESCRIPTION OF THE PREFERRED EMBODIMENTS OF THE INVENTION

Figure 1:
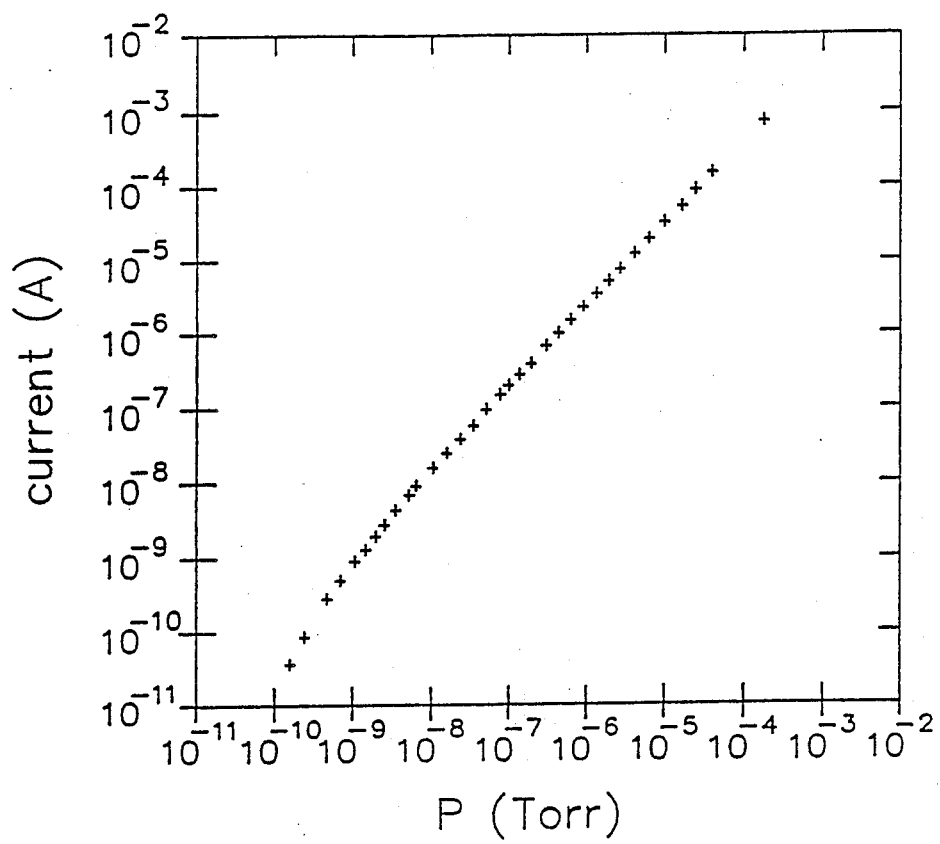
FIG. 1 shows an experimental current versus pressure characteristic for an inverted magnetron cold cathode gauge calibrated in nitrogen over the pressure range of $10^{-10}$ to $10^{-3}$ Torr where the series resistor $R_1$ was 1.00 meg Ohm and the linear portion of the characteristic extends to high pressures.

Reference should be made to the drawing where like reference numerals refer to like parts.

Figure 2:
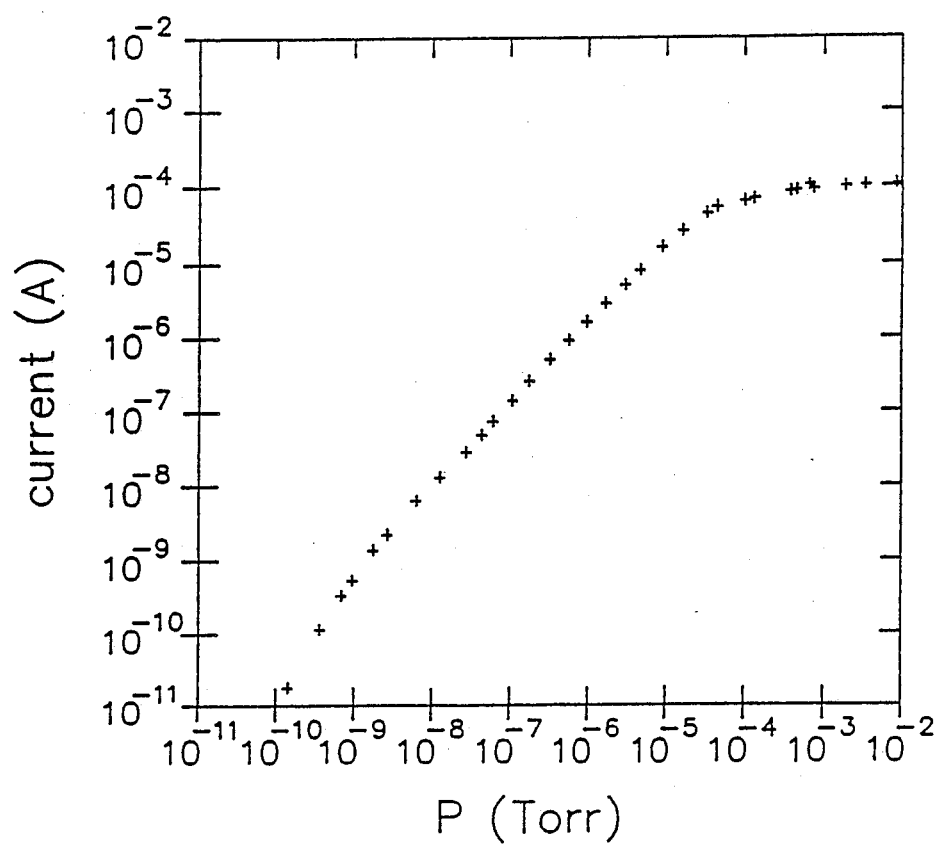
FIG. 2 shows an experimental calibration similar to that of FIG. 1, but using a 30.00 meg Ohm series resistor such that the current is limited at high pressures.
Figure 3:
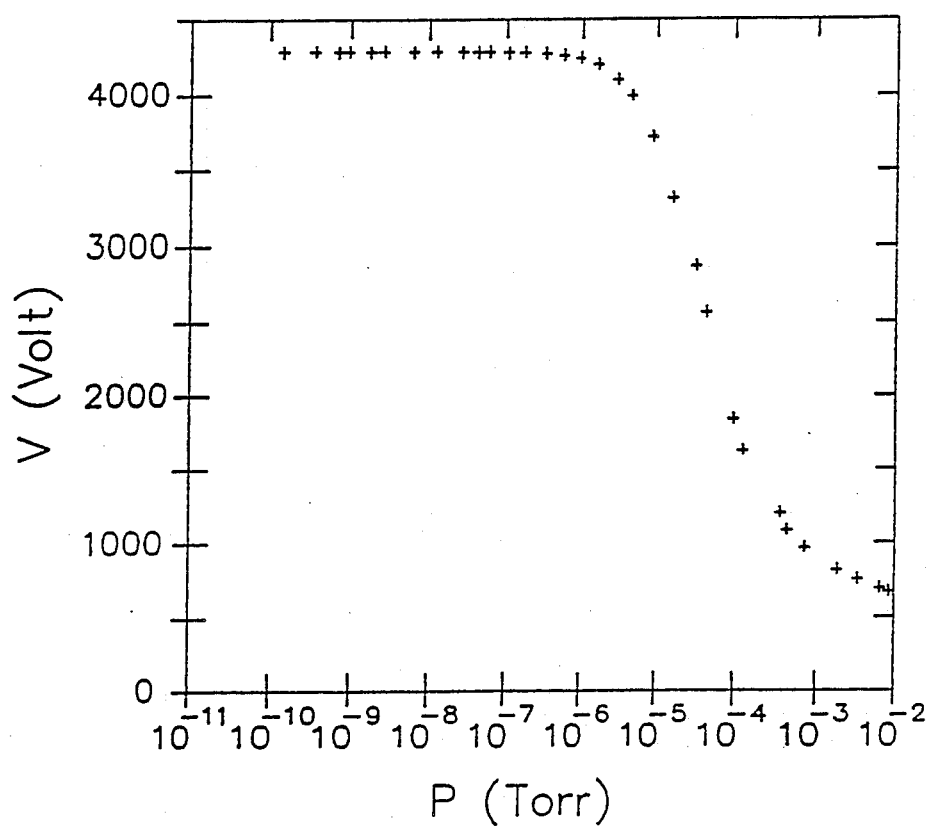
FIG. 3 shows the tube voltage data for the identical calibration of FIG. 2. Note that at pressures above $10^{-5}$ Torr where the current levels off in FIG. 2, the tube voltage is a function of pressure.
Figure 4:
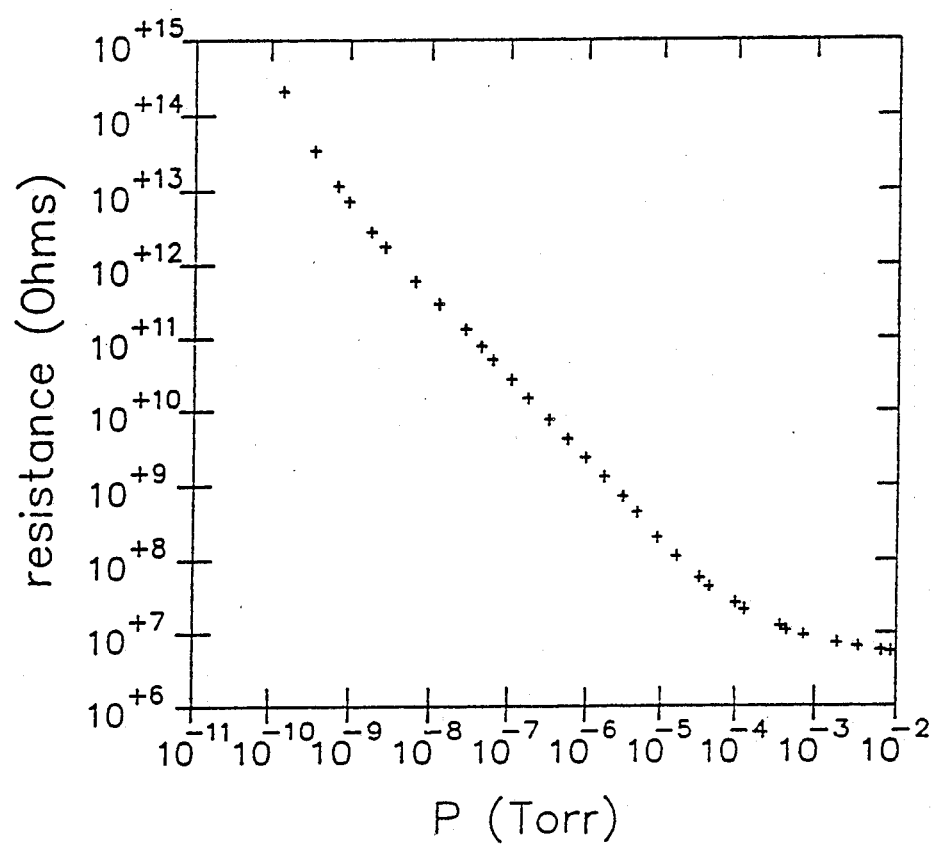
Figure 5:
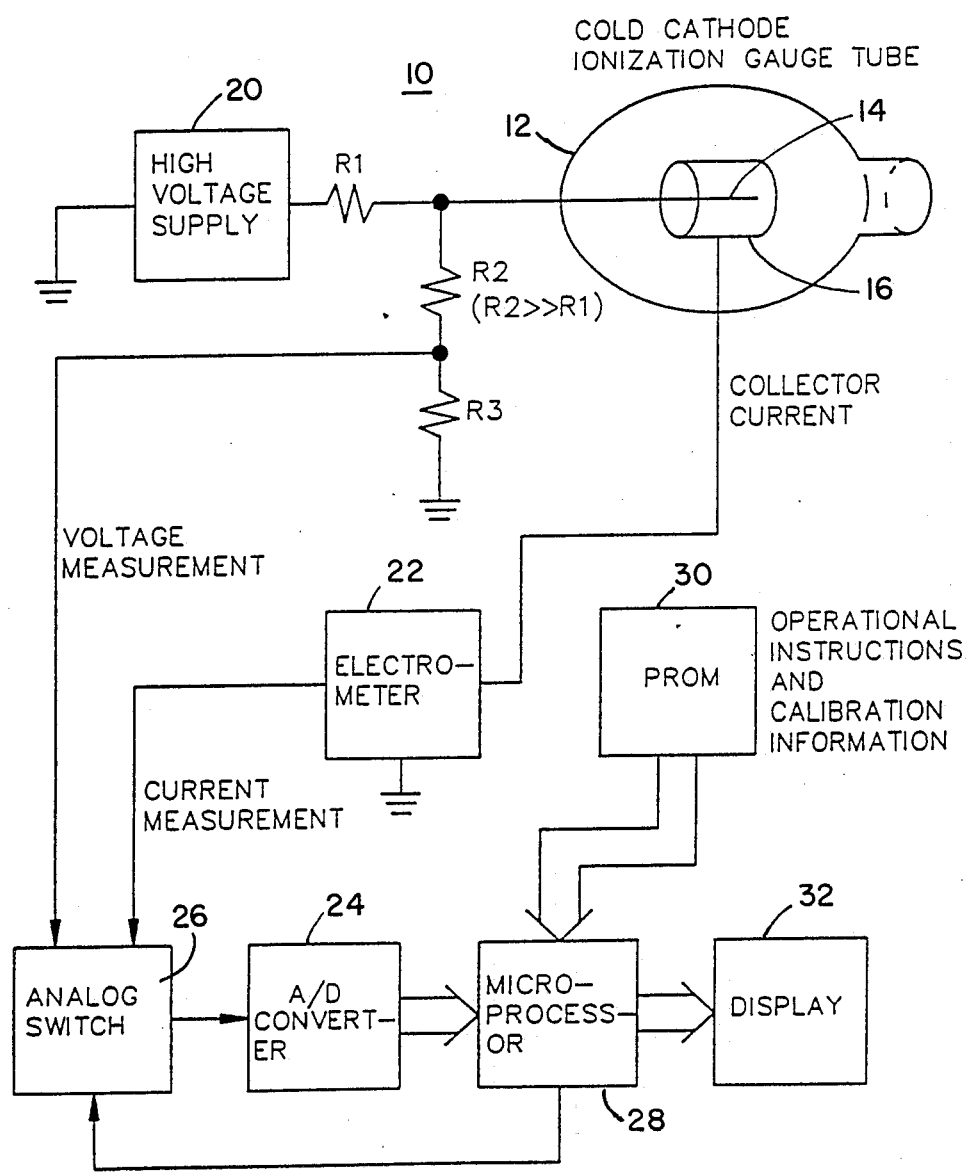
FIG. 5 is a block diagram of illustrative control circuitry utilizing gauge resistance as the pressure related parameter in accordance with the invention for use with a tube having separate feedthroughs for anode and cathode where neither is grounded.
Figure 6:
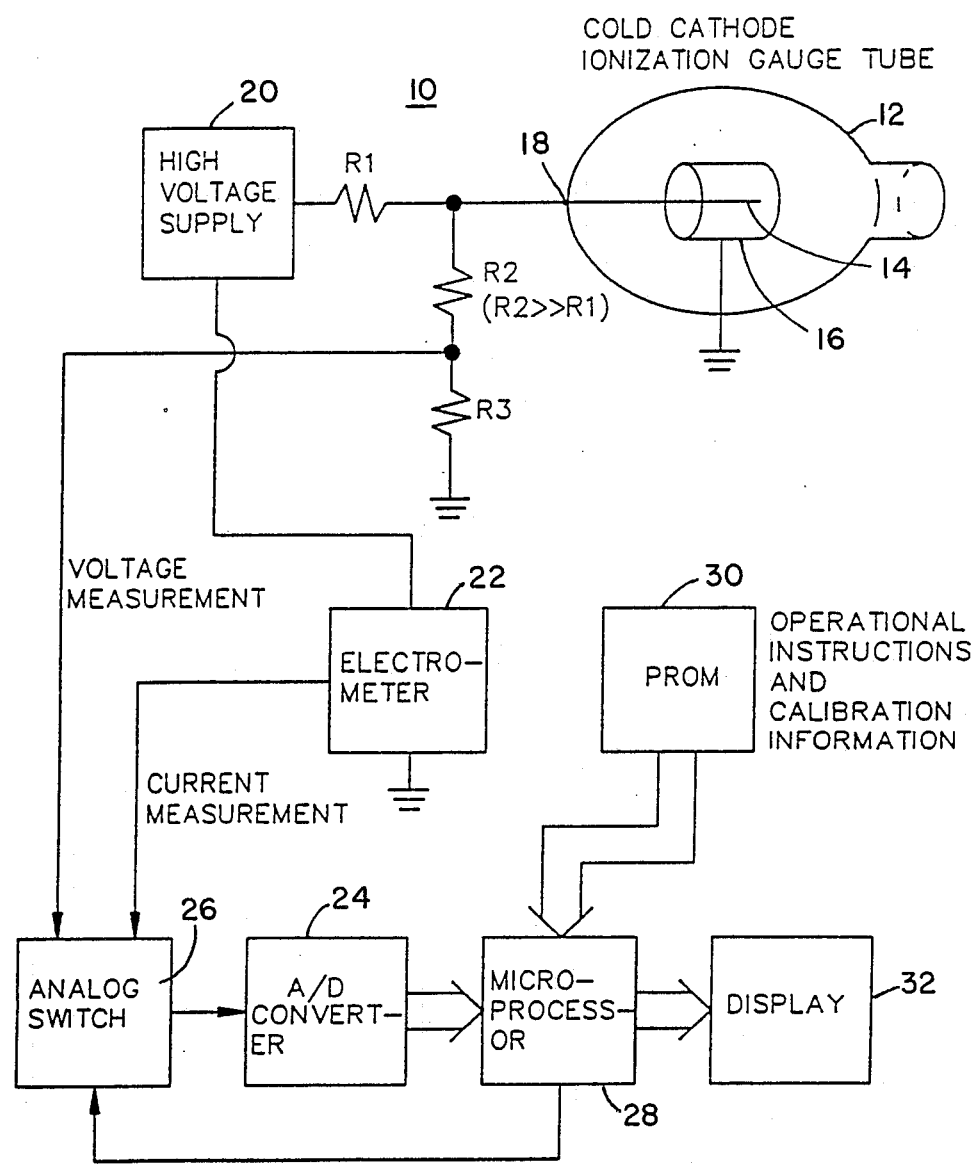
FIG. 6 is a block diagram of further illustrative control circuitry in accordance with the invention for use with a tube having only a single anode feedthrough, the cathode being connected to the grounded metal envelope.

The curve plotted in FIG. 4 was calculated manually from the same data used in FIGS. 2 and 3. In FIGS. 5 and 6, this calculation is automatically effected by a gauge controller 10 where the controller of FIG. 5 requires a tube 12 having separate feedthroughs for anode 14 and cathode 16 while that of FIG. 6 requires a tube 18 having only a single anode feedthrough 18 where the representation for the cold cathode gauge 12 in FIGS. 5 and 6 is symbolic for purposes of showing the electrical circuit, and the required magnet is not indicated.

In the circuits of both FIGS. 5 and 6, $R_1$ is the current limiting resistor connected between high voltage supply 20 and anode 14 where $R_1$ may be $30 \times 10^6$ ohms and the voltage of supply 20 may be about 4 KV where this voltage, in practice, typically varies from 2—6 KV. $R_2$ and $R_3$ form a voltage sampling divider for measuring the anode-to-ground voltage. The resistor $R_2$ is made very large so that the current through the divider has a negligible effect upon the voltage at the junction of $R_1$ and $R_2$. Typically, the value of $R_2$ may be about $1.25 \times 10^9$ ohms when $R_1$ is $30 \times 10^6$ ohms. The value of $R_3$ is typically such that several volts of sampling voltage are applied to analog-to-digital convertor 24, the magnitude of the voltage being determined by the specifications of the particular convertor utilized.

In FIG. 6, the voltage sampled at $R_3$ corresponds to the anode-to-cathode voltage of the tube because the voltage divider is connected between anode and ground and the cathode is connected to the grounded gauge wall. In FIG. 6, cathode 15 is at virtual ground due to the negligible impedance of electrometer 22. Hence, in the FIG. 6 embodiment, the anode-to-cathode voltage is also sampled at $R_3$.

The measurement of collector current from cathode 16 in FIG. 5 is effected by electrometer 22 connected to the cathode while in FIG. 6 measurement of current through the tube is effected by electrometer 22 connected to high voltage supply 20. Controller 10 senses the current and voltage by two successive closely spaced measurements using A/D converter 24 switched by an analog switch 26 under the control of a microprocessor 28. The time interval between successive voltage and current samples is typically about 1/30 second where the particular interval will depend on the specifications of the particular A/D converter used.

Division of the voltage and current measurements is effected in microprocessor 28 under the control of operational instructions stored in a memory such as a PROM 30 to thus obtain the resistance measurement of sensor 12. A curve similar to that of FIG. 4 stored in memory 30 as calibration information serves to translate the sensor resistance to pressure, which may then be displayed at a display 32.

Any type of cold cathode geometry other than the preferred inverted magnetron, including the normal magnetron and the Penning arrangement may be employed. With respect to the inverted magnetron, such a magnetron with single ended anode probe and single guard ring is the preferred geometry for use with the present invention. Sensor tubes (gauges) with either individual feedthroughs for anode and cathode, or those having one only, with the other electrode grounded, as discussed above, may be utilized. A controller using the present invention for only part of the pressure range may also be employed, especially that range above $10^{-6}$ Torr where both current and voltage vary with pressure. Moreover, a circuit having means other than a large resistor such as $R_1$ for limiting the current at high pressure may be employed. Furthermore, a control circuit using analog circuit design instead of the above-described digital circuits may also be used.

What is claimed is:

1. A cold cathode ionization gauge controller for measuring the pressure of a gas comprising:

means for measuring the electrical resistance of a cold cathode ionization gauge in communication with the gas where said measuring means includes means for measuring the current through the gauge and means for measuring the voltage across the gauge and means for dividing the measured voltage by the measured current to obtain said electrical resistance; and means for translating said electrical resistance to said pressure of the gas.

2. A gauge controller as in claim 1 where the dividing means includes means for digitally effecting the division.

3. A gauge controller as in claim 2 where said measuring means includes microprocessor means for effecting the division.

4. A gauge controller as in claim 2 including analog-to-digital converter means for respectively converting the measured voltage and current to digital signals and applying the digital signals to the dividing means.

5. A gauge controller as in claim 4 including switching means for consecutively switching the measured current and voltage to the digital-to-analog convertor means.

6. A cold cathode ionization gauge controller for measuring the pressure of a gas comprising:

means for measuring the electrical conductance of a cold cathode ionization gauge in communication with the gas where said measuring means includes means for measuring the current through the gauge and means for measuring the voltage across the gauge and means for dividing the measured current by the measured voltage to obtain said electrical conductance; and means for translating the measured parameter to said pressure of the gas.

7. A gauge controller as in claim 6 where the dividing means includes means for digitally effecting the division.

8. A gauge controller as in claim 7 where said measuring means includes microprocessor means for effecting the division.

9. A gauge controller as in claim 7 including analog-to-digital convertor means for respectively converting the measured voltage and current to digital signals and applying the digital signals to the dividing means.

10. A gauge controller as in claim 9 including switching means for consecutively switching the measured current and voltage to the digital-to-analog convertor means.

11. A gauge controller as in claims 1 or 6 where said translating means includes means for calibrating the gauge to measure pressures of the gas over a range extending at least from about $10^{-10}$ to $10^{-2}$ Torr.

12. A gauge controller as in claims 1 or 6 where said translating means includes means for calibrating the gauge to measure pressures where both the voltage across the gauge and the current through the gauge vary with said pressure of the gas.

13. A gauge controller as in claim 12 where said translating means includes means for calibrating the gauge to measure pressures of the gas greater than about $10^{-6}$ Torr.

14. A gauge controller as in claims 1 or 6 where said translating means includes memory means for storing calibration information utilized to effect the translation of the measured parameter to said pressure of the gas.

15. A gauge controller as in claims 1 or 6 where said gauge includes an anode and a cathode and separate feedthroughs for respectively applying a voltage to the anode and withdrawing current from the cathode.

16. A gauge controller as in claims 1 or 6 where said gauge includes an anode and a cathode and only a feedthrough for applying a voltage to the anode, the cathode being connected to the wall of the gauge.

17. A gauge controller as in claims 1 or 6 where the dividing means includes means for digitally effecting the division.

18. A gauge controller as in claim 17 where said measuring means includes microprocessor means for effecting the division.

19. A gauge controller as in claim 17 including analog-to-digital convertor means for respectively converting the measured voltage and current to digital signals and applying the digital signals to the dividing means.

20. A gauge controller as in claim 19 including switching means for consecutively switching the measured current and voltage to the digital-to-analog convertor means.

21. A gauge controller as in claims 1 or 6 where the cold cathode ionization gauge includes an anode and cathode and the controller includes a voltage source connected to the anode and means for limiting the current into the anode to a substantially constant value so that the voltage across the anode and cathode varies monotonically with respect to pressure at pressures greater than a predetermined value.

22. A gauge controller as in claim 21 where said predetermined pressure value is about $10^{-6}$ Torr.

23. A gauge controller as in claim 21 where said current limiting means comprises a resistor disposed between the voltage source and the anode.

24. A gauge controller as in claim 23 where said measuring means includes a voltage divider connected between said anode and a reference voltage, the voltage divider including at least two resistors, the first resistor being disposed between the anode and the second resistor and the second resistor being disposed between the first resistor and the reference voltage where the value of the first resistor with respect to that of the current limiting resistor is such that the current through the voltage divider has substantially no effect on the voltage applied to the anode.

25. A gauge controller as in claim 24 where the value of the first resistor is much greater than that of the current limiting resistor.

26. A gauge controller as in claim 24 where said reference voltage is ground.

27. A gauge controller as in claim 21 where said current measuring means includes an electrometer connected in circuit with the anode and cathode of the gauge.

28. A gauge controller as in claim 27 where said gauge includes separate feedthroughs for respectively applying the voltage to the anode and withdrawing the current from the cathode, said electrometer being connected to the cathode.

29. A gauge controller as in claim 27 where said gauge includes only a feedthrough for applying the voltage to the anode, the cathode being connected to the wall of the gauge and said electrometer being connected to the voltage source.

30. A cold cathode ionization gauge controller for measuring the pressure of a gas comprising:
means for measuring the electrical resistance of a cold cathode ionization gauge in communication with the gas where said measuring means includes means for measuring the current through the gauge and means for measuring the voltage across the gauge and means for dividing the measured voltage by the measured current to obtain said electrical resistance; and
means for translating said electrical resistance to said pressure of the gas;
where the cold cathode ionization gauge includes an anode and cathode and the controller includes a voltage source connected to the anode and a current limiting resistor disposed between the voltage source and the anode for limiting the current into the anode to a substantially constant value so that the voltage across the anode and cathode varies monotonically with respect to pressure at pressures greater than a predetermined value; and where said measuring means includes a voltage divider connected between said anode and a reference voltage, the voltage divider including at least two resistors, the first resistor being disposed between the anode and the second resistor and the second resistor being disposed between the first resistor and the reference voltage where the value of the first resistor with respect to that of the current limiting resistor is such that the current through the voltage divider has substantially no effect on the voltage applied to the anode.

31. A gauge controller as in claim 30 where the value of the first resistor is much greater than that of the current limiting resistor.

32. A gauge controller as in claim 30 where said reference voltage is ground.

33. A method for measuring the pressure of a gas in the cold cathode ionization gauge comprising the steps of
measuring the electrical resistance of the gauge where said measuring step includes measuring the current through the gauge and measuring the voltage across the gauge and dividing the measured voltage by the measured current to obtain said electrical resistance of the gauge; and
translating the measured parameter to said pressure of the gas.

34. A method for measuring the pressure of a gas in a cold cathode ionization gauge comprising the steps of
measuring an electrical conductance of the gauge where said measuring step includes measuring the current through the gauge and measuring the voltage across the gauge and dividing the measured current by the measured voltage to obtain said electrical conductance of the gauge; and
translating the measured parameter to said pressure of the gas.

35. A method as in claims 33 or 34 where said translating step includes calibrating the gauge to measure pressures of the gas over a range at least from about $10^{-10}$ to $10^{-2}$ Torr.

36. A method as in claim 33 or 34 where said translating step includes calibrating the gauge to measure pressures where both the voltage across the gauge and the current through the gauge vary with said pressure of the gas.

37. A method as in claim 36 where said translating step includes calibrating the gauge to measure pressures of the gas greater than about $10^{-6}$ Torr.

38. A method as in claim 33 or 34 where the cold cathode ionization gauge includes an anode and cathode and the method includes the steps of limiting the current into the anode to a substantially constant value so that the voltage across the anode and cathode varies monotonically with respect to pressure at pressures greater than a predetermined value.

39. A method as in claim 38 where said predetermined pressure value is $10^{-6}$ Torr.

* * * * *